Nov. 1, 1927.

C. McPHERSON 1,647,412

FRICTION DRIVING MECHANISM

Filed Nov. 17, 1924

INVENTOR
C. McPherson
By E.J. Fetherstonhaugh
ATTORNEY

Patented Nov. 1, 1927.

1,647,412

UNITED STATES PATENT OFFICE.

CHARLES McPHERSON, OF MONTREAL, QUEBEC, CANADA, ASSIGNOR, BY MESNE ASSIGNMENTS, TO FRICTION POWER CORPORATION LIMITED, OF MONTREAL, QUEBEC, CANADA.

FRICTION DRIVING MECHANISM.

Application filed November 17, 1924. Serial No. 750,497.

The invention relates to a friction driving mechanism, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to avoid the bad effects of an end thrust in friction gearing; to support the balancing friction rollers, so that the bracket support may accommodate itself to the vibration or other movements occurring as between engaging rollers and disk; to insure flexibility in transmission devices and the maximum power notwithstanding disturbances due to temporary displacements of disk or rollers; and to provide an efficient and serviceable driving mechanism for the betterment of equipments requiring mobility independently in the members communicating the power.

In the drawings Figure 1 is a longitudinal sectional view of the cross arm and roller bracket and the stationary supporting bar.

Like numerals of reference indicate corresponding parts in the various figures.

Figure 1:
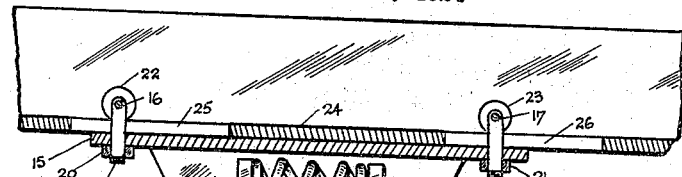
Figure 2:
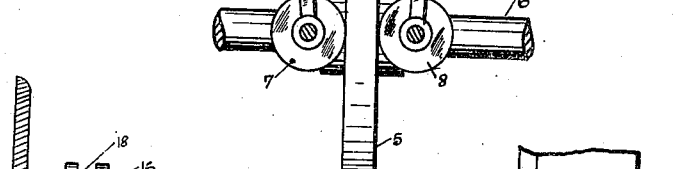
Figure 2 is a plan view of the supporting bar and cross arm and roller bracket.
Figure 3:
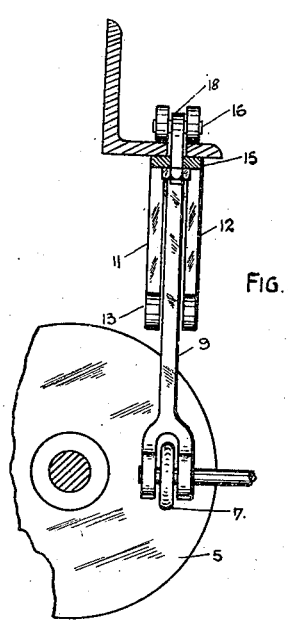
Figure 3 is a vertical sectional view of the mechanism.

Referring to the drawings, the disk 5 is shown as fixedly mounted on a driven shaft 6 and engaged by the rollers 7 and 8 on either side.

The rollers 7 and 8 are journalled in the forked ends of the rocker arms 9 and 10.

The bracket 11 for the support of the rocker arms 9 and 10 is here shown as formed of the parallel walls 11 and 12 having the pivotal bearings 13 and 14 at the lower ends at their upper ends secured to or forming part with the bar 15.

The bar 15 at the outer ends has the trolley bearings 16 and 17 with the threaded stems 18 and 19 held by the nuts 20 and 21 and in these bearings the trolley wheels 22 and 23 roll on the track 24 having the slots 25 and 26 for the stems 18 and 19, thereby suspending the bracket from the track 24 which is preferably a rigidly secured bar independent or forming part of the support for the bearing of the shaft 6 on which the disk is fixedly mounted.

It will thus be seen that while the disk is in a fixed position on the shaft 6, the rollers are in constant engagement with said disk being held thereto by the spring 25$^a$ introduced between the ends of the said rocker arms 9 and 10 and even if there are considerable variations of positions of shaft 6 and the frame of which the track 24 forms a part the bracket will slide in the frame and thereby keep the rocker arms still in the same state regarding the spring pressure for the distance remains fixed and the only effect of the sliding of the bracket is to alter slightly the angle of the arms without moving the rollers from their engagement.

It is of course understood that other ways may be shown of sliding the rocker arm bracket and that so long as the bracket is supported in ways that will insure flexibility regarding all movements for the lateral sliding motion the object of this invention will be attained as the helical spring between the arms also permits a freedom of motion that naturally assists the sliding mechanism without any loosening of the grip of the rollers.

Figure 5:
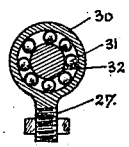
Figure 5 is a cross sectional detail of the ball bearings.
Figure 4:
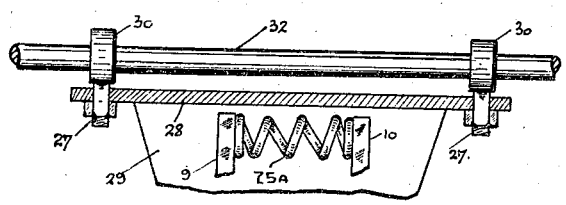
Figure 4 is a longitudinal view showing a modification of the sliding mechanism partially sectional.

Another means of sliding the bracket along is shown in Figures 4 and 5, in which the lugs 27 extend from the base 28 of the bracket 29 into rings 30 enclosing the ball bearings 31. The rod 32 forming the rigid support extends through the bearings 31 and thus an easy riding mechanism is assured as the rod 32 forms a rail on which the balls roll very smoothly and with the facility that is so well known of bearings of this type.

What I claim is:—

1. In friction driving mechanism, a trackway, a bracket, forming a carriage travelling on said trackway; a disk and a friction roller resiliently supported from said bracket and engaging said disk.

2. In friction driving mechanism, a track way, a bracket forming a carriage travelling on said track way, a disc fixedly secured on a driven shaft adjacent to said bracket, and a pair of friction rollers resiliently supported by said bracket and adapted to engage said disc.

3. In friction driving mechanism, a trackway, a bracket, forming a carriage travelling on said trackway, a disk, a pair of friction rollers engaging either side of said disk, a pair of roller arms pivotally mounted in said bracket and having bearings for said rollers spring-held to their contact notwithstanding the angular displacement of said arms due to the movement of said carriage.

4. In friction driving mechanism, a disk, suitably mounted rollers engaging said disk and balancing the thrust, pivoted arms supporting said rollers and a bracket for said arms freely movable according to the variations between the positions of the roller support and disk support.

5. In friction driving mechanism, a disk, suitably mounted rollers engaging said disk and balancing the thrust, pivoted arms supporting said rollers, spring mechanism holding said arms, a trackway and roller bearing, and a bracket supported from said bearing and forming a pivotal support for said spring-held arms.

6. In friction driving mechanism, a disk, suitably mounted rollers engaging said disk and balancing the thrust, pivoted arms forming pivot bearings for said rollers at the ends, ball bearing brackets slidably mounted, a gliding bearing member supporting said arms and carried by said ball bearing brackets from said shaft and a shaft support forming a truck for said ball bearing brackets.

Signed at Montreal, Canada this 15th day of November, 1924.

CHARLES McPHERSON.